Dec. 5, 1967  W. CHIAPPARELLI ET AL  3,356,874
ENCLOSED ROTOR DRIVE DEVICE
Filed March 23, 1964
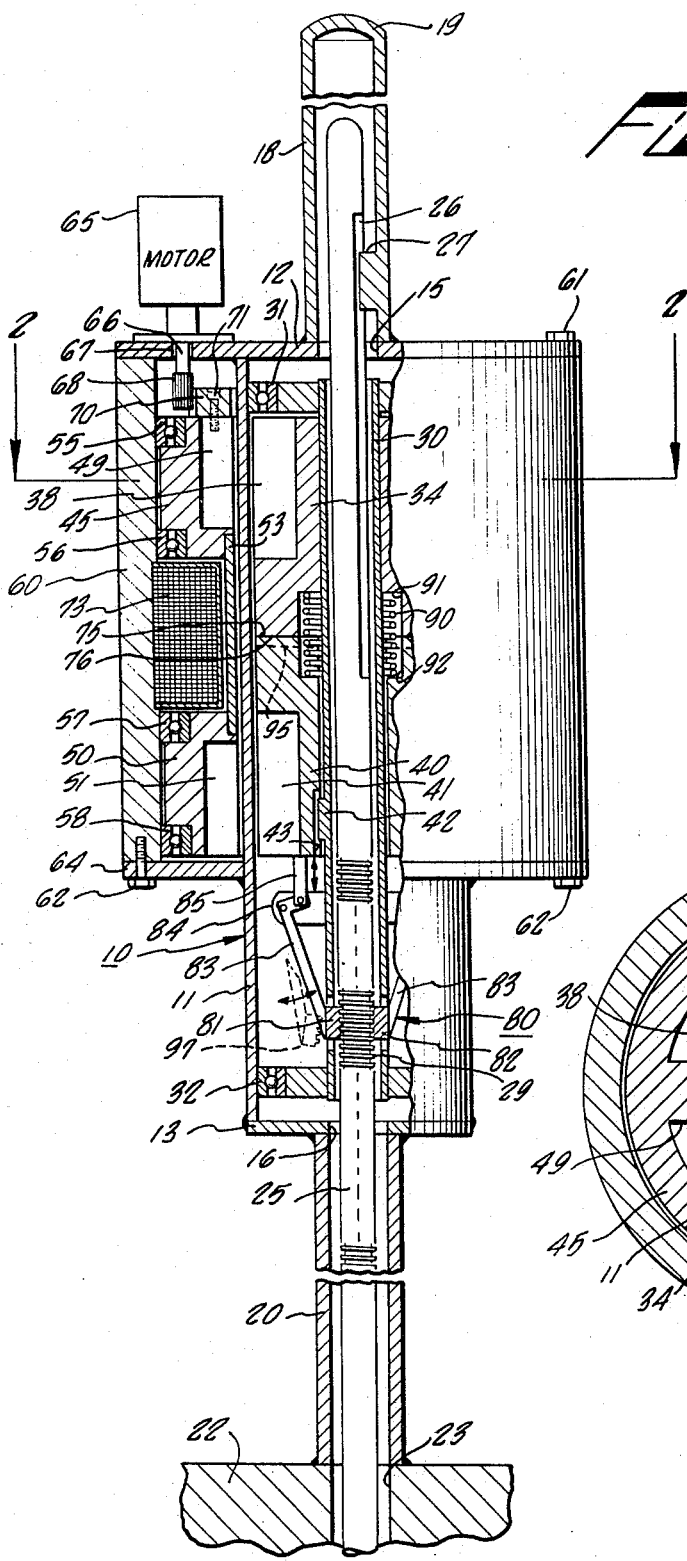
FIG_1.
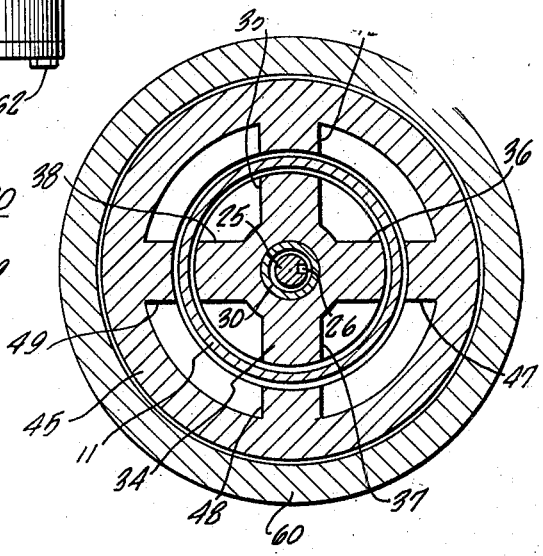
FIG_2.
INVENTOR.
WILLIAM CHIAPPARELLI
ROBERT NEIL JUNGLES
BY
Christie, Parker & Hale
ATTORNEYS.

ed Dec. 5, 1967

3,356,874
ENCLOSED ROTOR DRIVE DEVICE

William Chiapparelli, Pasadena, and Robert Neil Jungles, La Habra, Calif., assignors to Royal Industries, Inc., Pasadena, Calif., a corporation of California
Filed Mar. 23, 1964, Ser. No. 353,827
8 Claims. (Cl. 310—83)

The subject invention relates to electromechanical equipment and, more particularly, to drive or coupling apparatus.

The invention is particularly useful in connection with equipment that is to be maintained in a sealed state with respect to its environment. To name an example, it is well known that nuclear reactor installations, especially those of the pressurized water type, have to be maintained in sealed condition to prevent undesirable contaminations. The rate of nuclear reaction in these installations is commonly controlled by so-called poison rods which are selectively raised and lowered in the reactor. These poison rods are ordinarily mounted on drive rods which extend through apertures in the reactor. The drive rods are selectively raised and lowered by drive apparatus associated therewith. Since it is very important that there be no atomic contamination of the reactor's environment, the driving parts and the driven parts of these drive apparatus are frequently separated by a sealed casing. Serious problems are then encountered in transmitting power from the driving parts to the driven parts. In modern high pressure installations, shaft seals in the sealed casing are not sufficiently safe. To overcome this problem, it has been proposed to employ magnetic fields for transmitting power through the sealed casing. However, prior apparatus for realizing this proposal either were not sufficiently effective, or were very complex, or required complicated control equipment for their operation.

The subject invention provides improved drive or coupling apparatus which overcome the latter disadvantages.

The drive or coupling apparatus according to the invention comprises a casing, a rotor being rotatably mounted inside the casing and having a plurality of salient poles, an armature being rotatably mounted outside the casing and having a plurality of salient poles corresponding to the salient poles of the rotor, means for rotating the armature relative to the casing, and means for establishing a magnetic field through the armature, the casing and the rotor, to cause the rotor to rotate with the armature.

In a preferred embodiment of the invention, the casing includes a cylindrical tube and the rotor is cylindrical, is rotatably mounted inside this cylindrical tube and has a plurality of salient poles adjacent the cylindrical tube. The armature is then hollow-cylindrical, is rotatably mounted outside the cylindrical tube of the casing to extend therearound, and has a plurality of salient poles corresponding to the salient poles of the rotor and being located adjacent the cylindrical tube just referred to.

The means for establishing a magnetic field through the armature, the casing and the rotor comprise preferably a selectively energizable electromagnetic coil at the armature. In a preferred embodiment of the invention, this coil is hollow-cylindrical and is located coaxially to the cylindrical tube of the casing. Preferably, the armature is composed of two axially spaced armature sections between which this coil is located. This has the advantage that no wound armature poles are required. A coil of this type and arrangement is also easily cooled, where necessary.

The means for rotating the armature include preferably an electric motor. This motor may be of a conventional design. The invention thus enables the establishment and maintenance of a rotating magnetic field for driving the rotor inside the casing by simple means: a conventional motor, a conventional coil, and an unwound armature.

It will, of course, be recognized that the drive apparatus of the invention has other applications than the one referred to above. For example, the rotor of the drive apparatus could be employed for driving a pump impeller in a tubular conduit.

A further preferred embodiment of the invention comprises a casing, a driven member in the casing, and a pair of rotor sections mounted in the casing for rotary motion with respect to the casing and for relative translatory motion with respect to each other. This embodiment further includes a rotatable armature mounted outside the casing but in proximity to the rotor sections of the casing, and means, such as an electric motor, for rotating the armature. Furthermore, this embodiment includes selectively energizable and deenergizable electromagnetic means for establishing, when energized, a magnetic field through the armature, the casing and the rotor sections, to cause the rotor sections to rotate with the armature, and to cause the rotor sections to move translatorily with respect to each other to a first position. Means, such as a spring or springs, are provided for moving the rotor sections translatorily with respect to each other to a second position when the electromagnetic means are deenergized. Finally, this embodiment includes means for translating the rotary motion of the rotor sections to the driven member mentioned at the beginning of this paragraph, when the rotor sections are in their above-mentioned first position, and for releasing the driven member when the rotor sections are in their above-mentioned second position.

As will be appreciated as the description proceeds, apparatus of the type just described can be employed not only to selectively raise and lower a poison rod of a nuclear reactor in a controlled manner, but also to release the poison rod quickly in case of power failure or in case the nuclear reaction should become excessive. This latter so-called "scram" operation is accomplished simply by deenergizing the electromagnetic means, such as the coil, which produces the aforesaid magnetic field in the armature and the rotor sections.

The invention will become more readily apparent from the following detailed description of a preferred embodiment thereof, illustrated by way of example in the accompanying drawings, in which:

FIG. 1 is an elevation, partially in section, of a drive apparatus according to the invention for a poison rod of a nuclear reactor; and FIG. 2 is a section along lines 2—2 in FIG. 1.

The drive apparatus according to FIGS. 1 and 2 includes a casing 10 which is composed of a cylindrical tube 11 of non-magnetic material, such as stainless steel, with end plates 12 and 13 welded thereto. End plate 12 has an aperture 15 and end plate 13 an aperture 16. A tube 18 with a closed end 19 is welded to the end plate 12 at its aperture 15. A tube 20 is welded to the end plate 13 at its aperture 16. Reference numeral 22 designates a fraction of a cover of a nuclear reactor (not shown). Cover 22 has an aperture 23 at which tube 20 is welded thereto. The inside of the nuclear reactor is thus reliably sealed notwithstanding the presence of aperture 23.

A threaded rod 25 extends axially through part of tube 18, through cylindrical tube 11, through tube 20 and through aperture 23. A keyway 26 in rod 25 and a corresponding key 27 in tube 18 secure this rod against rotary movement. The thread in rod 25 is designated by the reference numeral 29. The threaded rod 25 has a poison rod (not shown) mounted on the lower end thereof. As has been mentioned above, a poison rod controls the rate of reaction of a nuclear reactor, in that it slows down the rate of reaction if it is lowered in the reactor and permits the rate of reaction to increase as it is raised in the reactor. This function per se is well known in the art.

A hollow shaft 30 extends axially in cylindrical tube 11 and encompasses the threaded rod 25. A pair of bearings 31 and 32 mount the shaft 30 for rotary movement in cylindrical tube 11.

A first cylindrical rotor section 34 is rigidly mounted on hollow shaft 30. As is more clearly apparent from FIG. 2, the first rotor section has a plurality of salient poles 35, 36, 37 and 38 which are located adjacent cylindrical tube 11. A second cylindrical rotor section 40 is mounted on hollow shaft 30 for axial movement with respect to the first rotor section 34. The second rotor section also has a plurality of salient poles, one of which is seen in FIG. 1 at 41. A key 42 on shaft 30, which extends into a corresponding keyway 43 in the second rotor section 40, secures the second rotor section against rotary movement with respect to shaft 30 and first rotor section 34. The first and second rotor sections 34 and 40 are of magnetizable material, such as mild steel.

A first hollow-cylindrical armature section 45 extends around tube 11 in spaced relationship thereto. The first armature section 45 is located to encompass the first rotor section 34. As is more clearly seen in FIG. 2, the first armature section 45 has a plurality of salient poles 46, 47, 48 and 49, which correspond to the poles 35, 36, 37 and 38 of the first rotor section 34. A second armature section 50 also extends around tube 11 in spaced relationship thereto. The second armature section 50 is located to encompass the second rotor section 40 and has a plurality of salient poles, one of which is shown at 51, which correspond to the salient poles of the second rotor section 40.

The first and second armature sections 45 and 50 are of a magnitizable material, such as mild steel, and are mutually spaced and rigidly interconnected by a hollow-cylindrical shaft 53 which encompasses the tube 11 and which is preferably of a non-magnetic material, such as stainless steel. A plurality of bearings 55, 56 57 and 58 rotatably mount the armature sections 45 and 50 to a hollow cylinder 60, which may be of mild steel. The hollow cylinder 60 is mounted on plate 12 by a plurality of screws, one of which is shown at 61. A plurality of screws 62 further mounts the hollow cylinder 60 on an annular plate 64 which is welded to tube 11. Hollow cylinder 60 may be of magnetizable material, such as mild steel.

A motor 65, mounted on plate 12, rotates the first and second armature sections 45 and 50 about the cylindrical tube 11. To this effect, motor 65 has a shaft 66 which extends through an aperture 67 in plate 12 and which carries a pinion 68. Pinion 68 is in engagement with an annular gear wheel 70 which is mounted on the first rotor section 45 by a plurality of screws, one of which is shown at 71. Torque is transmitted from the first armature section 45 to the second armature section 50 by the hollow-cylindrical shaft 53.

An electromagnetic coil 73 is mounted inside of and on the hollow cylinder 60 coaxially with respect to cylindrical tube 11 and extends into the space between armature sections 45 and 50. When energized with a direct current, the electromagnetic coil 73 establishes a magnetic field through the armature sections 45 and 50, the tube 11 of casing 10, and the rotor sections 34 and 40. The hollow cylinder serves thereby as a magnet yoke. As long as the motor 65 and the coil 73 are energized, the rotor sections 34 and 40 follow the rotation of the armature sections 45 and 50, or, in other words, rotate with the armature sections 45 and 50. Also, as long as the coil 73 is energized, the axially movable second rotor section 40 will be maintained in a position in which corresponding faces 75 and 76 of the rotor sections 34 and 40 are in contact. In this position, a nut structure 80 is maintained in contact with the threaded rod 25.

The nut structure 80 is composed of a plurality of nut sections 81 and 82 which define internal threads that correspond to the thread 29 in rod 25. Each nut section is mounted on a lever 83 which, in turn, is pivotally mounted on a lug 84 that projects from and is mounted on the rotor shaft 30 to rotate therewith. Each lever is actuated by a rod 85 which is connected to the second rotor section 40.

As long as the electromagnetic coil 73 is energized and the face 76 of the second rotor section 40 thus maintained in contact with the corresponding face 75 of the first rotor section 34, the nut sections of nut structure 80 are held in engagement with the thread 29 of the rod 25. As long as the motor is then energized, the rotor sections 34 and 40 will follow the rotation of the armature sections 45 and 50 and the rotation of the rotor sections 34 and 40 and of the hollow shaft 30 will be transmitted through the linkages formed by levers 83, lug 84 and rods 85 to the nut structure 80, which will thus rotate and impart axial motion to rod 25. If the motor 65 rotates in one direction and the coil 73 remains energized, the rod 25 will obviously be axially moved in one direction. If the motor 65 rotates in the other direction and the coil 73 remains energized, the rod 25 will obviously be axially moved in the other direction.

In this manner, the poison rod of the reactor (not shown) can be selectively raised and lowered, thereby controlling the rate of reaction of the nuclear reactor in a controlled fashion.

In nuclear reactors, it is necessary to effect quick release of the poison rods if the control equipment should experience a power failure or if the rate of nuclear reaction should become excessive. To this effect, the second rotor section 40 is made axially movable as hereinbefore described and a helical spring 90 is provided between the first and second rotor sections 34 and 40. The spring 90 is located in communicating cavities 91 and 92 of rotor sections 34 and 40, respectively, and tends to bias the second rotor section 40 away from the first rotor section 34. The length of the keyway 43 in the second rotor section 40 limits the distance by which this rotor section can move away from the first rotor section 34. If the coil 73 is deenergized for any reason, the magnetic field esablished by that coil through armature sections 45 and 50 and rotor sections 34 and 40 will cease and the spring 90 will move the second rotor section 40 away from the first rotor section 34. The second rotor section 40 will then assume a second position as opposed to the above-mentioned first positon in which its face 76 abuts the corresponding face 75 of the first rotor section 34. The location which the face 76 of the second rotor section 40 assumes in such second position is indicated in FIG. 1 by a dotted line 95. The axial or translatory movement of the second rotor section 40 from the first to the second position is transmitted to each lever 83 by each rod 85 connected to the second rotor sections 40. The levers 83 will then move the nut sections of nutstructure 80 away from the threaded rod 25, as indicated for nut section 81 by means of dotted lines 97. The released rod 25 will then be permitted to travel downwardly in a quick manner, thereby inserting the associated poison rod into the reactor to decelerate the nuclear reaction therein. In the shown embodiment, the released rod 25 travels downwardly by force of gravity. However, if desired, spring means or other accessories could be employed to impart downward movement on threaded rod 25.

If the coil 73 is energized, the second rotor section 40 will move back into abutting relation to the first rotor section 34, because the magnetic field established by coil 73 will tend to minimize any air gap between rotor sections 34 and 40. The levers 83 will thereby move the sections of nut structure 80 into engagement with threaded rod 25, and translatory upward or downward motion will be imparted to the threaded rod 25 as long as the motor 65 is operating and the coil 73 is energized. Deenergization of coil 73 will again result in quick release of the threaded rod 25, as hereinbefore described.

It will now be recognized that the electromagnetic coil 73 not only constitutes a simple means for establishing a magnetic field which, when rotated by the operation of motor 65, will cause rotation of rotor sections 34 and 40 and thus of nut structure 80, but also constitutes a simple means for effecting quick release and speedy reengagement of the threaded rod 25. The coil 73 further makes the provision of wound armature poles and resulting slip rings unnecessary and, being mounted on hollow cylinder 60, displays a high heat dissipation. In many applications, this heat dissipation affords adequate cooling of coil 73. However, additional cooling, where necessary, is easily effected by wrapping a refrigerant coil (not shown) about cylinder 60. Moreover, no complex control equipment is required for the energization of coil 73. In many applications, the motor 65 may be a conventional two-speed motor which is capable to cause movement of the threaded rod 25 at a first velocity and selectively at a second velocity. Use of a motor of this type further simplifies the power supply and control equipment.

If decreased friction is desired, the nut structure 80 can be composed of caged rollers which have helixes corresponding to the helical thread of rod 25. Such caged rollers are well known per se.

Many other modifications within the scope of the invention will be apparent to those skilled in the art.

8. A drive apparatus as defined in claim 7 including linkage means for imparting the rotary movement of the first and second rotor sections to said nut structure and for imparting axial movement of the second rotor structure with respect to the first rotor structure to the nut structure for moving the latter into driving engagement with the rod in response to the movement of the second rotor section to said second position and to move the nut structure out of driving engagement to release the rod in response to the movement of the second rotor section to said first position.
References Cited
UNITED STATES PATENTS
| | | | |
|---|---|---|---|
| 2,673,301 | 3/1954 | Richter | 310—86 |
| 2,780,740 | 2/1957 | Roman et al. | 310—67 |
| 2,875,694 | 3/1959 | Carter | 310—86 |
| 3,157,808 | 11/1964 | Lloyd | 310—96 |
FOREIGN PATENTS
| | | |
|---|---|---|
| 927,522 | 5/1963 | Great Britain. |
| 960,170 | 6/1964 | Great Britain. |
MILTON O. HIRSHFIELD, *Primary Examiner.*
J. D. MILLER, *Assistant Examiner.*
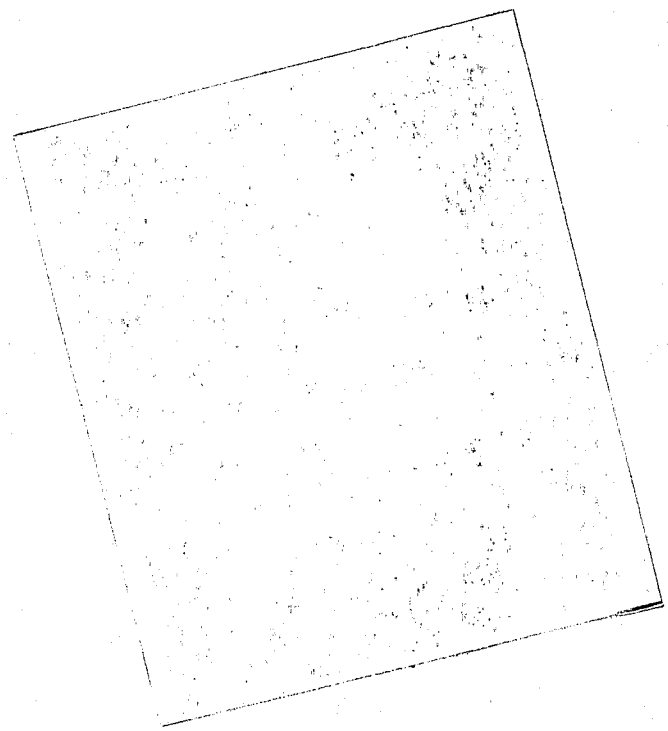

What is claimed is:

1. A drive apparatus, comprising:
   (a) a casing including a cylindrical tube;
   (b) a first cylindrical rotor section being rotatably mounted inside said cylindrical tube and having a plurality of salient poles adjacent said cylindrical tube;
   (c) a second cylindrical rotor section being rotatably mounted inside said cylindrical tube, having a plurality of salient poles adjacent said cylindrical tube and being mounted for axial movement with respect to the first rotor section;
   (d) a hollow-cylindrical armature rotatably mounted outside said cylindrical tube and extending around said cylindrical tube, said armature having a plurality of salient poles corresponding to the salient poles of the first and second rotor sections and being located adjacent said cylindrical tube;
   (e) means for axially biasing the second rotor section to a first position;
   (f) means for rotating the armature about said cylindrical tube;
   (g) a selectively energizable electromagnetic coil at the armature for establishing a magnetic field through the armature, said cylindrical tube and the first and second rotor sections, to cause the first and second rotor sections to rotate with the armature and to move the second rotor section axially relative to the first rotor section to a second position;
   (h) a rod inside the cylindrical casing, said rod having a helical thread and being secured against rotary movement;
   (i) a rotatable nut structure located inside said cylindrical tube and driven by said first and second rotor sections, said nut structure being composed of a plurality of nut sections defining threads corresponding to the helical thread of said rod, and said nut sections being movable into engagement with the helical thread on said rod to impart axial movement on said rod, and movable out of engagement with the helical thread on said rod to release said rod; and
   (j) means for moving said nut sections out of engagement with the helical thread on said rod in response to movement of the second rotor section to said first position, and for moving said nut sections into engagement with the helical thread on said rod in response to movement of the second rotor section to said second position.

2. A drive apparatus, comprising:
   (a) a casing including a cylindrical tube;
   (b) a first cylindrical section being rotatably mounted inside said cylindrical tube and having a plurality of salient poles adjacent said cylindrical tube;
   (c) a second cylindrical rotor section being rotatably mounted inside said cylindrical tube, having a plurality of salient poles adjacent said cylindrical tube and being mounted for axial movement with respect to the first rotor section;
   (d) a first hollow-cylindrical armature section being rotatably mounted outside said cylindrical tube, extending around said cylindrical tube and encompassing the first rotor section, said first armature section having a plurality of salient poles corresponding to the salient poles of the first rotor section and being located adjacent said cylindrical tube;
   (e) a second hollow-cylindrical armature section being rotatably mounted outside said cylindrical tube, extending around said cylindrical tube and encompassing the second rotor section, said second armature section being spaced from the first armature section and having a plurality of salient poles corresponding to the salient poles of the second rotor section and being located adjacent said cylindrical tube;
   (f) means for axially biasing the second rotor section to a first position;
   (g) means for rotating the first and second armature sections about said cylindrical tube;
   (h) a selectively energizable electromagnetic coil located in the space between the first and second armature sections for establishing a magnetic field through the first and second armature sections, said cylindrical tube and the first and second rotor sections, to cause the first and second rotor sections to rotate with the first and second armature sections and to move the second rotor section axially relative to the first rotor section to a second position;
   (i) a rod inside the cylindrical casing, said rod having a helical thread and being secured against rotary movement;
   (j) a rotatable nut structure located inside said cylindrical tube and driven by said first and second rotor sections, said nut structure being composed of a plurality of nut sections defining threads corresponding to the helical thread of said rod, and said nut sections being movable into engagement with the helical thread on said rod to impart axial movement on said rod, and movable out of engagement with the helical thread on said rod to release said rod; and
   (k) means for moving said nut sections out of engagement with the helical thread on said rod in response to movement of the second rotor section to said first position, and for moving said nut sections into engagement with the helical thread on said rod in response to movement of the second rotor section to said second position.

3. A drive apparatus, comprising:
   (a) a casing including a cylindrical tube;
   (b) a hollow shaft rotatably and axially mounted in said cylindrical tube;
   (c) a rod extending through said hollow shaft, having a helical thread and being secured against rotary movement;
   (d) a rotatable nut structure in said casing for imparting axial motion on said rod, said nut structure being composed of a plurality of nut sections defining threads corresponding to the helical thread of said rod, said nut sections being selectively movable into engagement with the helical thread of said rod and movable out of said engagement to release said rod;
   (e) a first cylindrical rotor section located in said cylindrical tube and mounted on said hollow shaft, said first rotor section defining a plurality of salient poles adjacent said cylindrical tube;

7

(f) a second cylindrical rotor section located in said cylindrical tube and mounted on said hollow shaft for axial movement with respect to the first rotor section to a first position and selectively to a second position, said second rotor section defining a plurality of salient poles adjacent said cylindrical tube;

(g) a hollow-cylindrical armature rotatably mounted outside said cylindrical tube and extending around said cylindrical tube, said armature having a plurality of salient poles corresponding to the salient poles of the first and second rotor sections and being located adjacent said cylindrical tube;

(h) means for axially biasing the second rotor section to said first position;

(i) means for rotating the armature about said cylindrical tube;

(j) a selectively energizable electromagnetic coil at the armature for establishing a magnetic field through the armature, said cylindrical tube and the first and second rotor sections, to cause the first and second rotor sections to rotate with the armature and to move the second rotor section to said second position; and (k) linkage for imparting rotary movement of the first and second rotor sections to said nut structure and for imparting axial movement of the second rotor structure with respect to the first rotor structure to the nut sections of the nut structure to move the nut sections into engagement with the helical rod in response to movement of the second rotor section to said second position, and to move the nut sections out of said engagement to release said rod in response to movement of the second rotor section to said first position.

4. A drive apparatus, comprising:
(a) a casing including a cylindrical tube;
(b) a hollow shaft rotatably and axially mounted in said cylindrical tube;
(c) a rod extending through said hollow shaft, having a helical thread and being secured against rotary movement;
(d) a rotatable nut structure in said casing for imparting axial motion on said rod, said nut structure being composed of a plurality of nut sections defining threads corresponding to the helical thread of said rod, said nut sections being selectively movable into engagement with the helical thread of said rod and movable out of said engagement to release said rod;
(e) a first cylindrical rotor section located in said cylindrical tube and mounted on said hollow shaft, said first rotor section defining a plurality of salient poles adjacent said cylindrical tube;
(f) a second cylindrical rotor section located in said cylindrical tube and mounted on said hollow shaft for axial movement with respect to the first rotor section to a first position and selectively to a second position, said second rotor section defining a plurality of salient poles adjacent said cylindrical tube;
(g) a first hollow-cylindrical armature section being rotatably mounted outside said cylindrical tube, extending around said cylindrical tube and encompassing the first rotor section, said first armature section having a plurality of salient poles corresponding to the salient poles of the first rotor section and being located adjacent said cylindrical tube;
(h) a second hollow-cylindrical armature section being rotatably mounted outside said cylindrical tube, extending around said cylindrical tube and encompassing the second rotor section, said second armature section being spaced from the first armature section and having a plurality of salient poles corresponding to the salient poles of the second rotor section and being located adjacent said cylindrical tube;
(i) means for axially biasing the second rotor section to said first position;

8

(j) means for rotating the first and second armature sections about said cylindrical tube;
(k) a selectively energizable electromagnetic coil located in the space between the first and second armature sections for establishing a magnetic field through the first and second armature sections, said cylindrical tube and the first and second rotor sections, to cause the first and second rotor sections to rotate with the first and second armature sections and to move the second rotor sections axially relative to the first rotor section to said second position; and
(l) linkage for imparting rotary movement of the first and second rotor sections to said nut structure and for imparting axial movement of the second rotor structure with respect to the first rotor structure to the nut sections of the nut structure to move the nut sections into engagement with the helical rod in response to movement of the second rotor section to said second position, and to move the nut sections out of said engagement to release said rod in response to movement of the second rotor section to said first position.

5. A drive apparatus, comprising:
(a) a casing including a cylindrical tube;
(b) a first cylindrical rotor section being rotatably mounted inside said cylindrical tube and having a plurality of salient poles adjacent said cylindrical tube;
(c) a second cylindrical rotor section being rotatably mounted inside said cylindrical tube, having a plurality of salient poles adjacent said cylindrical tube and being mounted for axial movement with respect to the first rotor section;
(d) a hollow-cylindrical armature rotatably mounted outside said cylindrical tube and extending around said cylindrical tube, said armature having a plurality of salient poles corresponding to the salient poles of the first and second rotor sections and being located adjacent said cylindrical tube;
(e) means for axially biasing the second rotor section to a first position;
(f) means for rotating the armature about said cylindrical tube;
(g) means for establishing a magnetic field through the armature, said cylindrical tube and the first and second rotor sections, to cause the first and second rotor sections to rotate with the armature and to move the second rotor section axially relative to the first rotor section to a second position;
(h) a rod inside the cylindrical casing;
(i) a nut structure for said rod located inside said cylindrical tube, said first and second rotor sections driving said rod and nut structure to produce relative axial movement between same; and
(j) means for moving said rod and nut structure out of driving engagement in response to movement of the second rotor section to said first position, and for moving said rod and nut structure into driving engagement in response to movement of the second rotor section to said second position.

6. A drive apparatus as defined in claim 5 wherein said means for establishing a magnetic field comprises a selectively energizable electromagnetic coil.

7. A drive apparatus as defined in claim 5 wherein the rod is secured against rotary movement and said nut structure is movable into and out of driving engagement with said rod to impart axial movement to said rod.